United States Patent [19]

Steele

[11] Patent Number: 4,880,204

[45] Date of Patent: Nov. 14, 1989

[54] LOAD TRANSMITTING DEVICE

[75] Inventor: Raymond E. Steele, Warwickshire, Great Britain

[73] Assignee: Rapid Metal Developments Ltd., Aldridge, England

[21] Appl. No.: 218,292

[22] Filed: Jul. 12, 1988

[30] Foreign Application Priority Data

Jul. 17, 1987 [GB] United Kingdom ............... 8716855
Mar. 23, 1988 [GB] United Kingdom ............... 8806911

[51] Int. Cl.⁴ ............................................. E04G 17/06
[52] U.S. Cl. ........................... 249/219.2; 249/40; 249/213; 269/904; 403/338
[58] Field of Search .................... 249/23, 25, 40, 44, 249/45, 47, 190, 191, 210, 211, 213, 216, 219.1, 219.2; 269/41, 246, 247, 904; 403/300, 331, 337, 338

[56] References Cited

U.S. PATENT DOCUMENTS

| | | | |
|---|---|---|---|
| 3,141,224 | 7/1964 | Gates | 249/210 |
| 3,315,938 | 4/1967 | Gates | 249/219.1 |
| 3,357,672 | 12/1967 | Capek | 249/216 |
| 3,927,858 | 12/1975 | Underhill | 249/213 |
| 4,046,343 | 9/1977 | Kambara | 403/338 |
| 4,068,818 | 1/1978 | Gates | 249/216 |
| 4,219,180 | 8/1980 | Strickland | 249/219.2 |
| 4,231,541 | 11/1980 | Strickland | 249/216 |
| 4,350,318 | 9/1982 | Gallis | 249/219.2 |
| 4,553,729 | 11/1985 | Connors | 249/191 |
| 4,601,600 | 7/1986 | Karlsson | 403/338 |

*Primary Examiner*—James C. Housel
*Attorney, Agent, or Firm*—Fleit, Jacobson, Cohn, Price, Holman & Stern

[57] ABSTRACT

A load transmitting device for use in transmitting load from a tie rod to a beam used as a support for a concrete casting formwork, has a bridging member which bridges between adjacent lateral flanges of the beam, and restraint means acting between the bridging member and a surface of the beam facing oppositely to the flange surfaces bridged by said member, in such a manner as to resist bending of the flanges engaged by the bridging member as a result of bending force applied to the bridging member by the tie rod loading the flanges at right angles to the longitudinal direction of the beam.

3 Claims, 5 Drawing Sheets

LOAD TRANSMITTING DEVICE

This invention relates to a load transmitting device, primarily for use in transmitting loads from a tie rod to a beam used as a support in concrete casting formwork. The invention is concerned particularly with a device intended to transmit load, in a direction transverse to the beam longitudinal axis, to an adjacent pair of lateral flanges extending along the beam.

The load bearing capacity of an arrangement of this general kind is limited by the tendency of the lateral flanges to flex under load, either towards or away from the adjacent side of the beam, with a consequent risk of buckling of the beam itself.

An object of the invention is to provide a simple load transmitting device for the aforesaid purpose which enables a flanged beam to withstand significantly higher loads than hitherto when used as a formwork support.

According to the present invention, there is provided a load transmitting device for use in transmitting load from a tie rod to a beam used as a support for a concrete casting formwork, said device comprising a bridging member having a dimension such as, in use, to bridge between and overlie adjacent lateral flanges of the beam, and restraint means acting, in use, between said bridging member and a surface of the beam facing generally oppositely to those overlaid by the bridging member in such a manner as to resist bending of said lateral flanges as a result of bending force applied to the bridging member by a tie rod loading the flanges at right angles to the longitudinal direction of the beam.

In one commonly used type of beam, opposed pairs of spaced parallel flanges are provided, of which flanges respectively from each pair are bridged, in use, by the bridging member, the free end portion of each flange being turned out of the plane of the flange towards the opposing flange. With such a beam, the restraint means can be shaped so as to provide a surface which lodges, in use, under the free edge of the adjacent turned flange portion in order to resist said bending of the flanges.

In an alternative arrangement for use with this type of beam, the restraint means again provides a surface which lodges, in use, under the free edge of the adjacent turned flange portion to resist said bending of the flange, but also extends into engagement with the opposed flange of the same pair in order to provide increased resistance to bending of the flanges.

From another aspect of the invention, a formwork support assembly comprises a support beam for the formwork and a tie rod connected to the beam by a load-transmitting device of which a bridging member is arranged to bridge between and overlie adjacent lateral flanges of the beam, and of which restraint means acts between the bridging member and a surface of the beam facing generally oppositely to those overlaid by the bridging member in such a manner as to resist bending of said flanges flanges as a result of bending force applied to the bridging member by the tie rod loading the flanges at right angles to the longitudinal direction of the beam.

The invention will now be described by way of example, with reference to the accompanying drawings in which.

Figure 1:
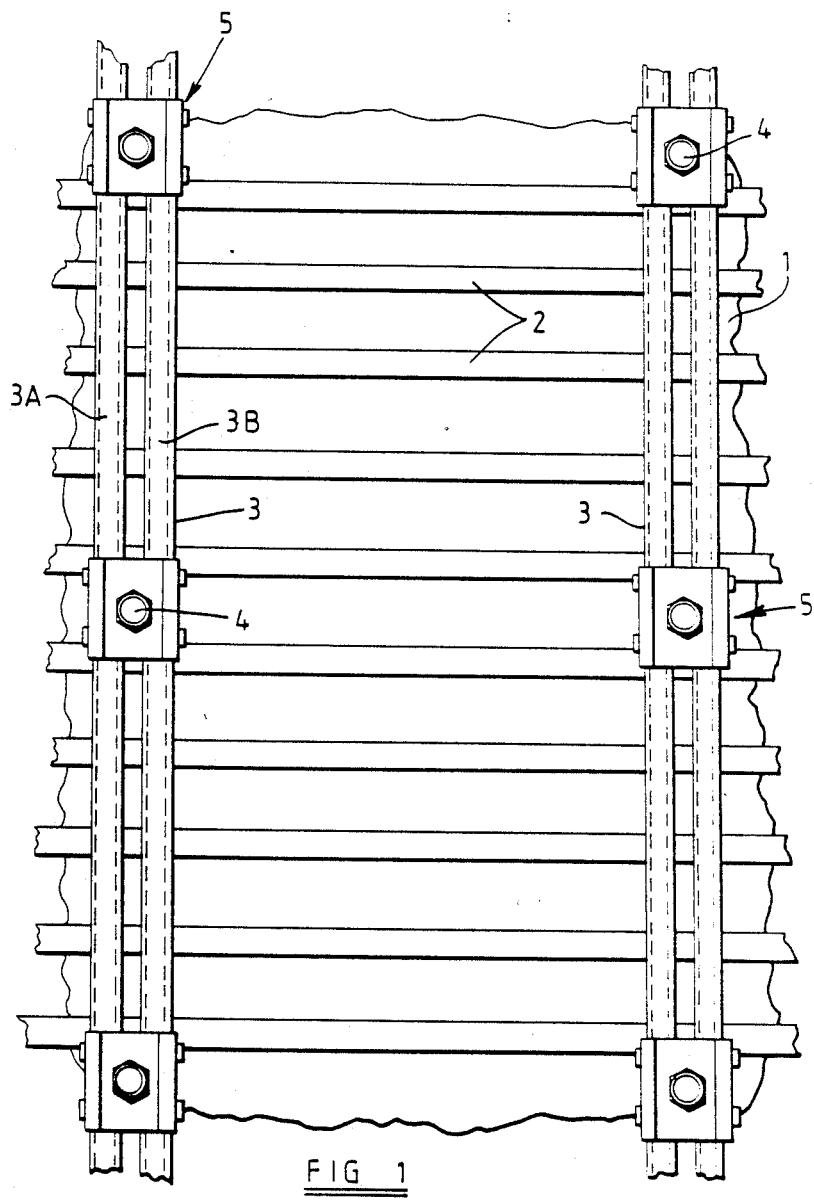
FIG. 1 is an end view of part of a concrete casting formwork embodying the load transmitting device of the invention.
Figure 2:
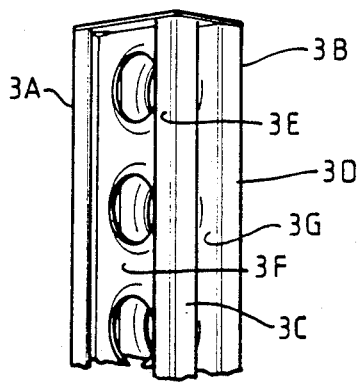
FIG. 2 is a perspective view of one form of standard soldier with which the device of the invention may be used.
Figure 2:
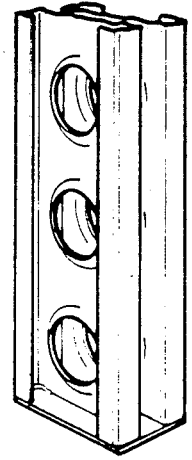

Referring to FIGS. 1 and 2, these show part of a concrete casting formwork system in which an assembly of a formwork panel 1 and waling bars 2 are supported by vertical soldiers 3 secured to the waling bars by clips or clamps (not shown), in conventional manner. Each soldier is composed of a pair of parallel channel-shaped members 3A, 3B arranged back-to-back with the bases of the channels in opposed spaced relationship. In a typical formwork arrangement for the casting of a structure, such as a wall for example, a pair of panels 1 are supported in spaced relationship to form a cavity within which concrete is poured and the bursting forces imposed by the poured concrete are resisted by tie rods extending through the cavity and rigidly attached to the soldiers 3 by way of "she" bolts 4 extending between the channel members 3A, 3B of the soldiers. Alternatively, the "she" bolts may be replaced by other conventional force-resisting means. The bolts are anchored to the soldiers by way of load transmitting devices, indicated generally at 5, which transmit the concrete loads from the soldiers to the tie rods. The invention is particularly concerned with an improvement in such load transmitting devices, and one such device will now be described in more detail with reference to FIGS. 2 and 3.

The load-transmitting device 5 is shown in association with a soldier 3, of which the channel-shaped members 3A, 3B are partly illustrated. The members 3A, 3B have respective sides forming flanges 3C, 3D, of which the free end portions 3E are turned inwardly at right angles so as to lie generally parallel with the bases or webs 3F, 3G of the respective channel-shaped members.

The load transmitting device 5 includes a waler plate 6 of dimensions such as to bridge across the flanges 3C, 3D, the plate desirably having a width slightly less than the width of the soldier across these flanges but not necessarily so. A "she" bolt 4 extends through a hole 6A in the plate 6 and a nut 8 is attached to a threaded end portion 9 of the bolt and screwed against the outer surface of the plate 6, in use, in order to connect the bolt to the soldier in conventional manner.

A pair of attachment devices 10 are provided, the left hand one of which is illustrated in its assembled condition and the right hand one separated for ease of illustration. Each device 10 is generally in the form of a channel having a base 10A and a first side 10B at right angles to the base, the second side 10C being inclined inwardly towards the base 10A. The width of the base 10A is such as to enable the attachment device 10 to embrace the lateral edge of the waler plate 6 and the oppositely facing longitudinal edge of the inwardly turned flange part 3E. In the embodiment illustrated, the device 5 is slid downwardly along the assembly to the position illustrated and held in that position by one or more screws or other fixing devices 11 passing through a slot or hole 12 in the attachment device and engaging a corresponding threaded hole 13 formed in the lateral edge of the plate 6. The slight undersize in the width dimension of the plate, as illustrated, enables the plate to resist sliding along the soldier by co-operation with the devices 10. It may be convenient to incline the side 10B of the device 10 outwardly away from the inclined side 10C in order to provide a lead for facilitating assembly of the device and to permit the taking up of manufacturing tolerances. The plate may alternatively have a width greater than the aforesaid width of the soldier, in which case the devices 10 may be inwardly stepped beneath the plate to engage a respective lateral adjacent surface of the soldier flange to provide lateral location of the plate.

The plate 6 is also provided with a pair of spacers illustrated as generally U-shaped formations 14 secured, as for example, by welding to the inner surface of the plate 6 and having a width such as to fit closely between the webs 3F, 3G of the soldier channels.

Figure 3:
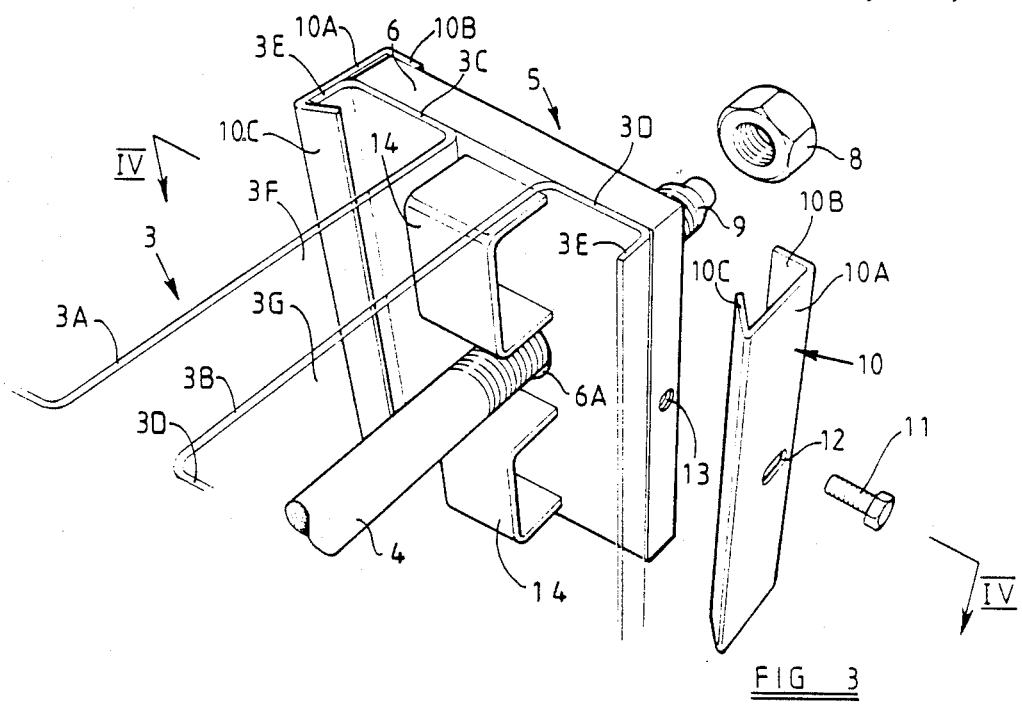
FIG. 3 is an enlarged partially exploded view of one form of the load transmitting device of the invention.

With the attachment devices 10 assembled in the manner illustrated at the left hand side of FIG. 3, and the nut 8 tightened against the outer surface of the waler plate 6, load transmitted from the tie rod to the "she" bolt 4 is applied via the plate 6 to the flanges 3C, 3D of the soldier. It will be seen that any tendency of the flanges 3C, 3D to be deflected inwardly by the applied forces is resisted by the attachment devices 10, which are hooked around the free edges of the inwardly turned flange portions 3E. Any small deflection which occurs will cause slight inward deformation of the webs 3F, 3G into engagement with the sides of the spacers 14 which then act to prevent further such deformation, effectively locking the webs 3F, 3G and flanges 3C, 3D in rigid relationship. By preventing excessive deformation of the flanges and webs of the soldier, the force transmitting device of the invention enables very significantly higher loads to be applied to the standard soldier than has been possible hitherto.

Figure 5:
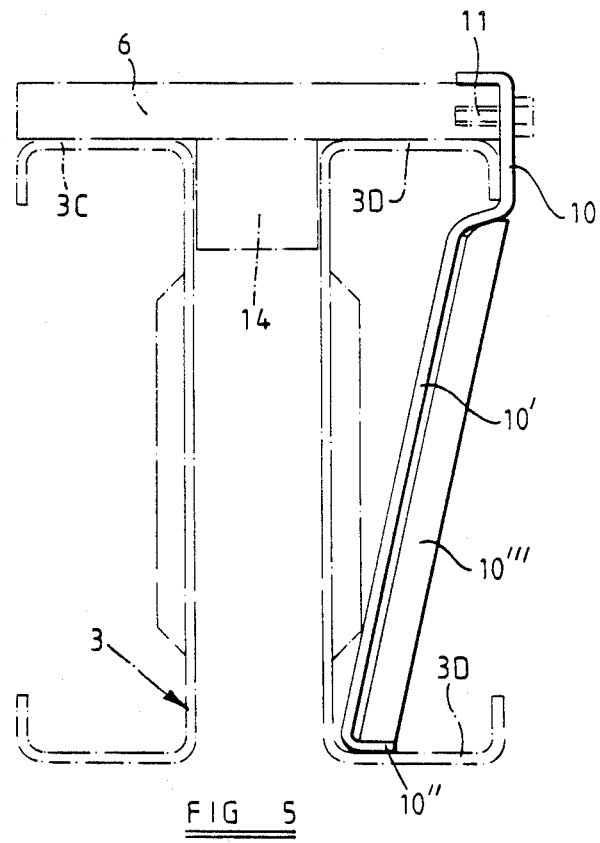
FIG. 5 is a view similar to FIG. 3 of an alternative embodiment of the load transmitting device of the invention.

FIG. 5 illustrates an alternative embodiment of the invention in which each attachment device 10 is provided with an extension arm 10' which extends obliquely into engagement with the inner surface of the flange 3D remote from the flange engaged by the plate 6, the arm having an inturned portion 10" to provide an adequate surface area for engagement with the flange. The arm 10' is stiffened by a longitudinal rib 10''', although this may be achieved by other suitable means. The attachment device 10 is held in place on the plate 6, as before, by screws or other securing devices 11 and a device identical with that shown at the right hand side of FIG. 5 is provided also on the channel member 3 at the left hand side. The use of the extension arm 10' enables the attachment device 10 to transmit a proportion of the load directly on to the flange 3D remote from the plate 6 as well as to the flange 3D engaged by the plate. One or more spacers 14 are provided and function in the manner described above in connection with FIGS. 2 and 3. When only one spacer is provided, it may be convenient for the "she" bolt 4 to pass through the spacer.

Although the attachment devices 10 have been illustrated in both of the above-described embodiments as separable from the plate 6, it would be possible to rigidly attach one or both of the attachment devices to the plate. The side 10C of the attachment device, instead of being inclined as described may be parallel with the side 10B, or substantially so. Whether inclined or not, the side 10C may be foreshortened to facilitate fitting the attachment device to the soldier flange.

Figure 4:
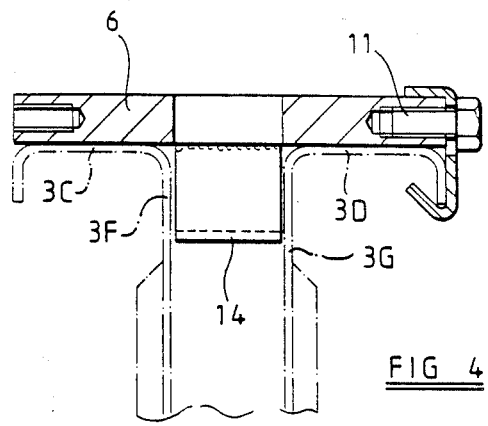
FIG. 4 is a cross-section generally along the line IV—IV of FIG. 3.
Figure 6:
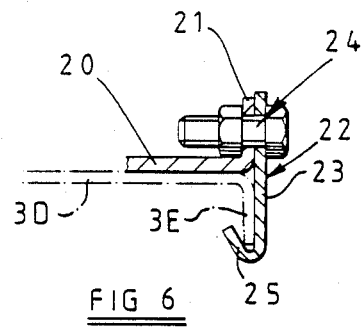
FIGS. 6 to 11 are scrap views illustrating different embodiments of the invention.

The embodiment of the invention illustrated in FIG. 6 is similar to that of FIG. 4, the main difference being that the relatively thick bridging plate 6 of the latter is replaced by a thin plate 20, of which the ends are deformed upwardly to form flanges 21. An attachment device 22 has a straight portion 23 parallel to and lying against the flange 21, and a nut and bolt assembly 24 is provided to clamp the two together. The free end 25 of the device 22 is upwardly angled to engage an end portion of an adjacent turned over flange portion 3E of the flange 3D for the purpose of minimising deformation of the beam in the manner described above.

Figure 7:
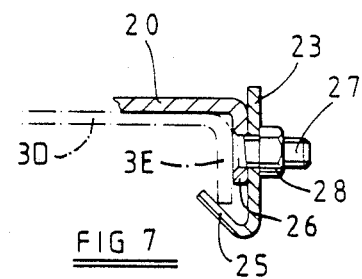

In the embodiment of FIG. 7, the plate 20 is again relatively thin and has a downwardly bent portion 26 extending at right angles to the plate. A stud 27 is secured to and projects outwardly from this portion and is passed through the attachment device 23 to be engaged by a nut 28 acting to clamp the assembly together, as before, with an upwardly angled portion 25 of the device 23 engaging an adjacent turned over part 3E of the flange 3D.

Figure 8:
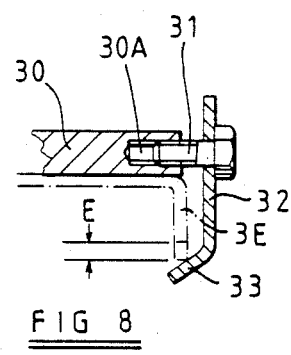

FIG. 8 illustrates an alternative embodiment using a relatively thick bridging plate 30 formed with threaded aperture 30A which receives a clamping screw 31. An attachment device is provided in the form of a plate 32, the free end 33 of which is bent to form an obtuse angle relative to the remainder of the plate. This arrangement enables the attachment device to accommodate a small amount of variation 'E' in the length of the adjacent turned over flange part 3E, the position of the screw 31 being adjustable to enable the end portion 33 to engage the flange part 3E at a position depending upon the length of the latter. The device 32 of this embodiment may replace the equivalent device in any other embodiment of the invention to enable variations in the length of a corresponding flange part of the beam to be accommodated.

Figure 9:
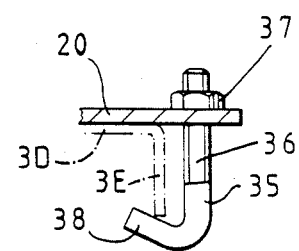

It is possible for the attachment device to be other than of plate-like form and FIG. 9 illustrates one alternative possibility in which the device is in the form of a rod 35 of which a portion 36 is threaded to receive a nut 37. A free end portion 38 of the rod 35 is angled relative to the remainder of the rod and engages an adjacent turned over part 3E of a flange 3D, and the nut 37, engaged with the rod at the opposite side of the bridging plate to the flange, applies a clamping force between the plate and flange in a manner such as to minimise deformation of the beam, as described previously. Although the bridging plate 20 is illustrated as being relatively thin, the attachment device of FIG. 4 may equally well be used with a relatively thick bridging plate, e.g. of the kind illustrated in FIG. 3.

Figure 10:
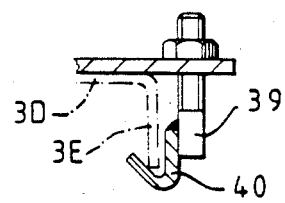

FIG. 10 illustrates a further alternative embodiment, similar in principle to that of FIG. 9, but in which the rod 39 is foreshortened and has attached thereto a hook-shaped portion 40 for engaging the flange part 3E in the manner and for the purpose described previously.

Figure 11:
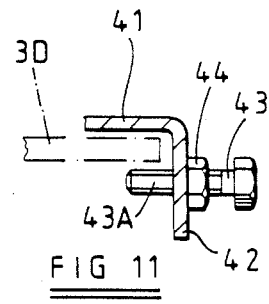

In the embodiment of FIG. 11, useful when the flange 3D has no turned over portion, a bridging plate 41 has a downwardly extending portion 42 and is provided with a threaded aperture which receives a bolt 43, the rotation of which is normally prevented by a lock nut 44. The free end portion 43A of the bolt 43 lies at the opposite side of the flange 3D to the portion 41 of the attachment device and flexing of the beam, of which the flange 3D forms a part, is minimised by engagement of the flange with the portion 41 and bolt 43. In a similar alternative arrangement, the aforesaid aperture may be unthreaded and a threaded body such as a nut secured to the portion 42 in alignment with the aperture.

Figure 12:
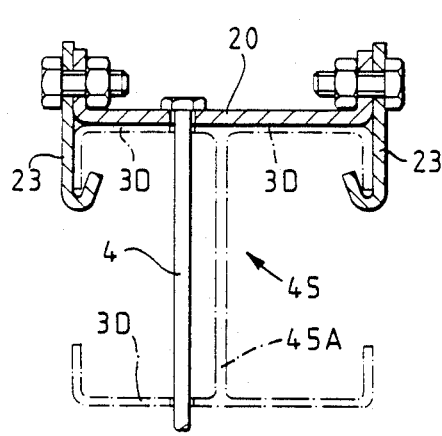
FIG. 12 illustrates the device of FIG. 6 applied to an I-beam.

A typical practical example of the use of the attachment device illustrated in FIG. 6 is shown in FIG. 12. The device is used with an I-beam 45, the beam having opposed laterally extending flanges 3D bridged by the bridging plate 20, the latter being anchored to the flanges 3D by a pair of attachment devices 23. A tie rod 4 extends through the plate 20 and beam flanges 3D to one side of a central web 45A of the beam. The effect of this arrangement is to minimise flexing of the beam, upon application of force to the beam via the tie rod 4, in the manner described in relation to FIG. 4 of our aforesaid co-pending application.

Figure 13:
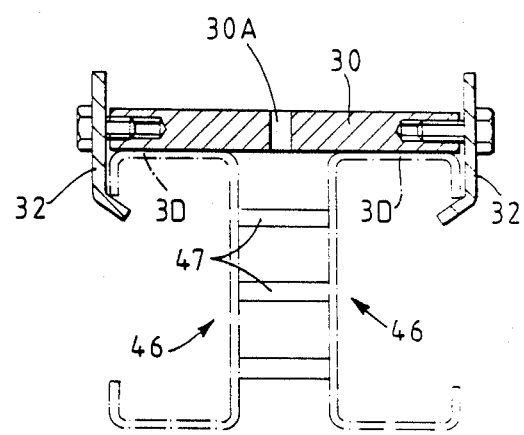
FIG. 13 illustrates the device of FIG. 3 applied to an alternative form of beam.

In the arrangement of FIG. 13, pair of spaced back-to-back channel members 46 are interconnected by spacers 47. Respective opposed lateral flanges 3D of the members 46 are interconnected by attachment devices of the kind shown in FIG. 3, the bridging plate 30 extending across the flanges 3D and being anchored thereon by the attachment devices 32 in order to minimise flexing of the beam, in the manner described previously. A tie rod would, in use, extend through a hole 30A of the plate 30 and between the flanges 46.

Figure 14:
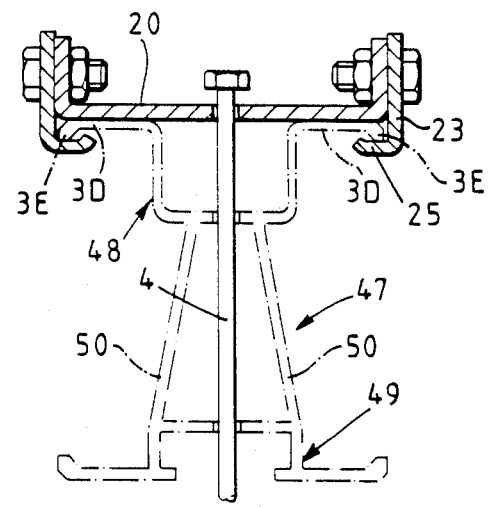
FIG. 14 illustrates a further alternative form of the device of the invention applied to another alternative form of beam.

A further alternative form of beam is illustrated at 47 in FIG. 14, the beam having an upper channel-shaped formation 48 terminating in lateral flanges 3D. A lower inverted channel formation 49 is connected to the upper formation by a pair of webs 50 which converge in a direction towards the upper formation. The flanges 3D are bridged by a bridging plate 20 and attachment device 23 of the general kind illustrated in FIG. 6, to which force is applied via a tie rod 4 extending through the plate 20 and beam. The attachment device is modified slightly in that the angled end portion 25 is perpendicular to the remainder of the device and engages under angled end portions 3E of the flanges 3D. The arrangement operates as previously described in order to minimise distortion of the beam.

It will be understood that any embodiment of the load transmitting device of the invention may be used on any of the beams illustrated in FIGS. 12 to 14, or on any appropriate alternative form of beam. The shapes of the various components may be modified in various ways consistent with achieving the necessary resistance to deformation of the beam.

I claim:

1. A load transmitting device for use in transmitting load from a tie rod to a beam used as a support for a concrete casting formwork, said beam having at least one web member with oppositely extending adjacent lateral flanges at one end of the web member, each lateral flange having a free end portion which extends towards an end of the web member opposite said one end, said device comprising a bridging member having a dimension to bridge between and overlie outer surfaces of the adjacent lateral flanges of the beam, and restraint means acting, in use, between said bridging member and a surface of the beam facing generally oppositely to said surfaces overlaid by the bridging member in such a manner as to resist bending of said lateral flanges as a result of bending force applied to the bridging member by a tie rod loading the lateral flanges at a right angle to the longitudinal direction of the beam, the restraint means being shaped so as to provide surfaces which lodge, in use, under the free end portions of the adjacent lateral flanges in order to resist said bending of the flanges, wherein the bridging member is a plate and the restraint means are generally U-shaped members having a base and respective arms at opposite ends of the base, said U-shaped members embrace the plate and the free end portions of said adjacent lateral flanges and wherein the U-shaped members are secured to the bridging member by screw means extending through the base and into the bridging member.

2. A device according to claim 1 wherein one arm of at least one of the U-shaped members converges towards the base and the free end portion of one of said adjacent lateral flanges lodges in the junction between said one arm and said base.

3. A device according to claim 1 wherein the beam comprises opposed spaced web members and the bridging member is provided on one side thereof with spacing means positioned so as, in use, to fit and maintain the spacing between respective opposed web members of the beam.

* * * * *